United States Patent [19]

Kunishi

[11] Patent Number: 5,087,660
[45] Date of Patent: Feb. 11, 1992

[54] PROCESS AND APPARATUS FOR HEAT TREATMENT OF POLYMER CONTAINING LIQUID

[75] Inventor: Noriyuki Kunishi, Ichihara, Japan

[73] Assignee: Idemitsu Petrochemical Co., Ltd., Tokyo, Japan

[21] Appl. No.: 485,491

[22] Filed: Feb. 27, 1990

[30] Foreign Application Priority Data

Mar. 8, 1989 [JP] Japan .................................. 1-53940
Sep. 5, 1989 [JP] Japan ................................. 1-228378

[51] Int. Cl.$^5$ ...................... C08J 5/02; C08F 283/00; C08F 2/00; C08F 6/00
[52] U.S. Cl. .................................. 524/611; 524/466; 524/470; 524/473; 525/461; 525/462; 526/62; 528/480; 528/481; 528/485; 528/490; 528/491; 528/497; 528/498
[58] Field of Search ............... 528/480, 481, 485, 490, 528/491, 497, 498; 525/461, 462; 524/466, 470, 473, 611; 526/62

[56] References Cited

U.S. PATENT DOCUMENTS 4,383,092 5/1983 Ko et al. ........................ 526/62

Primary Examiner—John Kight, III
Assistant Examiner—T. Mosley
Attorney, Agent, or Firm—Antonelli, Terry Stout & Kraus

[57] ABSTRACT

A process for treating a mixture of a polymer and a chlorinated organic solvent under heating, characterized by employing an apparatus in which a portion thereof to be brought into contact with the heated mixture is made of an acid resistant inorganic material selected from a group consisting of a metallic composition containing at least 85% of copper, nickel or a mixture thereof, and a ceramic material. Deterioration in color is improved in a process for recovering a polymer dissolved in the chlorinated organic solvent.

19 Claims, 5 Drawing Sheets

PROCESS AND APPARATUS FOR HEAT TREATMENT OF POLYMER CONTAINING LIQUID

BACKGROUND OF THE INVENTION

1. Field of the Invention

The present invention relates to a process and an apparatus for a heat treatment of a polymer containing liquid, more particularly, to a process and an apparatus for a heat treatment of a polycarbonate solution wherein deterioration in color is eliminated or reduced in a process for recovering a polycarbonate resin dissolved in a chlorinated organic solvent.

2. Description of the Related Art

As an industrial process for manufacturing a polycarbonate, a phosgene method and a melt transesterification method are generally known. The melt transesterification method has a disadvantage of color deterioration of a product, because of a prolonged treatment at an elevated temperature. Thus, the phosgene method is prevailingly employed.

After washing the polycarbonate solution (polymer solution) produced by polymerization, the phosgene method requires steps of concentration (flaking), drying (removing a solvent), and then, granulation (pelletizing), in separate apparatuses. Of those steps, the concentration and drying steps are severe burdens. Large equipment such as a kneader or a dryer is needed, and an operation cost is too expensive.

Accordingly, it is desired to simplify the above steps. Various processes for recovering a polymer from a polymer solution were proposed.

For example, a process for isolating the polymer from the polymer solution by adding a poor solvent is described in Japanese Examined (KOKOKU) Patent Publications No. 37-5599, No. 37-18399, No. 39-1959, No. 42-14474 and so on. Japanese Examined (KOKOKU) Patent Publication No. 53-15899 describes a process for gelling and grinding the polymer solution by a kneader or the like. Japanese Unexamined (KOKAI) Patent Publication No. 60-115625 discloses a process for obtaining the polymer in the form of a slurry by bringing the polymer solution into contact with a hot water to remove the solvent with a steam. The above processes have both advantages and disadvantages. Each process needs a number of steps, and costs of an initial construction of equipment and operation thereof are very expensive.

As a simplified and economical process for manufacturing polycarbonate to remedy the above disadvantages, Japanese Unexamined (KOKAI) Patent Publication No. 62-183801 discloses a process for producing polycarbonate in a melted state by heating the polymer solution with a specific heat exchanger to remove the solvent. However, the process has disadvantages of coloring of polycarbonate by a heat deterioration, and a residual solvent in a recovered polycarbonate.

It is well known that polycarbonate is characterized by high impact properties and good transparency. Thus, reduction of transparency, i.e., color deterioration by heat deterioration can be a considerable defect. The problem of heat deterioration may be solved by lowering a temperature at a heat desolvation as low as possible, and shortening a heating time as short as possible. Under such conditions, however, an amount of the residual solvent is increased. For sufficiently removing the residual solvent, it is necessary to raise the temperature of the heat desolvation and prolong the desolving time. Therefore, it is difficult to obtain polycarbonate with good transparency and without the residual solvent, by the above-mentioned process.

An apparatus, such as an extruder, wherein a polymer is treated at a temperature above the glass transition temperature thereof (Tg) may generally encounter the coloring problem of the polymer by heat deterioration. If a chlorinated organic solvent, such as methylene chloride, which may be preferably used as a solvent for polycarbonate, or metallic impurities are contained in a great amount, the polymer are considerably affected thereby. It is believed that the chlorinated organic solvent is decomposed to produce hydrochloric acid, which forms a metallic chloride upon contacting with a treating apparatus. The metallic chloride serves as a catalyst to accelerate deterioration and coloring of the polymer. The above phenomenon is a general problem in a polyester resin (in a broad sense) having oxygen containing ester bonds. In particular, polycarbonate is tremendously affected. The metallic impurities are believed to enter from the apparatus used in a high temperature treatment, by a decomposing action of the solvent.

An influence of the decomposition of the chlorinated organic solvent can be avoided by employing a material inactive to the produced hydrochloric acid, such as an inorganic material (for example, glass or ceramics), or a precious metal (for example, gold) which has an anticorrosive property in a practical use. However, it was considered difficult to realize the use of such a material, because of a cost, a strength, and a construction problem, and further, in the case of the inorganic material (for example, glass or ceramics), heat transmission.

SUMMARY OF THE INVENTION

The inventor of the present invention conducted various research projects to develop a process and an apparatus for a heat treatment of a polymer containing liquid (particularly, a polycarbonate solution), whereby the above disadvantages are remedied; costs of an initial construction of equipment and operation thereof are reduced, an amount of the residual solvent in the recovered polymer (particularly, polycarbonate) is decreased, and the coloring problem by heat deterioration of the recovered polymer (particularly, polycarbonate) is eliminated or reduced. As a result, the inventor found that a desired effect can be obtained by constructing a treating apparatus with a specific material. It was generally believed that the coloring of polycarbonate by heat deterioration is liable to occur at melting, solvent-removing and extruding steps in the production steps thereof. However, the inventor found that the step of melting polycarbonate does not substantially affect deterioration, because the polycarbonate solution can smoothly pass through the step, and thus, a duration time therein becomes short. To the contrary, it was found that the coloring by heat deterioration is tremendously affected by the solvent-removing and extruding steps, because polycarbonate is liable to adhere an inside of the apparatus, and thus, stay therein for a long time.

Accordingly, the inventor found that the coloring can be considerably reduced by applying a means for preventing the solvent from decomposing and the metallic impurities from incorporating, to devices used for the solvent-removing and extruding steps. Further, it was found that because the polycarbonate solution is melted in a device for heating the solution, and then, supplied to the solvent-removing and extruding devices, a quality of a product is not substantially affected by low heat transmission at the latter devices.

Therefore, the desired effect can be obtained when portions to be brought into contact with polycarbonate, in the devices used for the solvent-removing and extruding steps, are formed from an acid resistant inorganic material as mentioned below. The present invention is completed on the basis of the above findings.

Accordingly, an object of the present invention is to provide a process for a heat treatment of a polymer containing liquid, particularly a polycarbonate solution, by employing an apparatus containing a portion formed from the specific acid resistant inorganic material.

Other objects and advantages of the present invention will be apparent from the following description.

In accordance with the present invention, there is provided a process for treating a mixture of a polymer and a chlorinated organic solvent under heating, which comprises employing an apparatus in which a portion thereof to be brought into contact with the heated mixture is made of an acid resistant inorganic material selected from a group consisting of a metallic composition containing at least 85% by weight of copper, nickel or a mixture thereof, and a ceramic material.

Further, in accordance with the present invention, there is also provided an apparatus for treating a mixture of a polymer and a chlorinated organic solvent under heating, wherein a portion thereof to be brought into contact with the heated mixture is made of an acid resistant inorganic material selected from a group consisting of a metallic composition containing at least 85% by weight of copper, nickel or a mixture thereof, and a ceramic material.

BRIEF DESCRIPTION OF THE DRAWINGS

FIGS. 5 to 7 illustrate a heat exchange unit in a plate-fin type of a heat exchanger arranged in a solvent-removing apparatus;

DESCRIPTION OF THE PREFERRED EMBODIMENTS

In the present invention, a polycarbonate produced by a conventional polycondensation is employed as a starting material. For example, there may be employed a polycarbonate or a copolymer thereof produced by the phosgene method wherein a dihydric phenol (a starting monomer) and phosgene is polycondensed in a chlorinated organic solvent, such as methylene chloride, in the presence of a catalyst, such as a tertiary amine (e.g., triethylamine).

As the dihydric phenol for the starting monomer, various bisphenols may be used, but 2,2-bis(4'-hydroxyphenyl)propane (hereinafter referred to as bisphenol A) is preferable. Bisphenols produced by substituting all or a part of bisphenol A with other dihydric phenols may be also used. As dihydric phenol other than bisphenol A, there may be mentioned, for example, halogenated bisphenols, such as hydroquinone; 4,4'-dihydroxydiphenyl; bis(4-hydroxyphenyl)alkane; bis(4-hydroxyphenyl)cycloalkane; bis(4-hydroxyphenyl)sulfide; bis(4-hydroxyphenyl)sulfoxide; bis(4-hydroxyphenyl)sulfone; bis(4-hydroxyphenyl)ketone, or 2,2-bis(3',5'-dibromo-4'-hydroxyphenyl)propane. Polyhydric (i.e., trihydric or more) phenols, such as phloroglucinol, or phloroglucide, may be used in combination with the above dihydric phenols.

The chlorinated organic solvent is a compound which has been used as a solvent for the starting materials in the steps for manufacturing polycarbonate. In a production of polycarbonate, it is inevitable to omit the solvent.

As the solvent, there may be mentioned, for example, methylene chloride (which is preferably used in general), tetrachloroethane, trichloroethane, dichloroethane, trichloroethylene, dichloroethylene, chloroform, chlorobenzene, o-, m- or p-dichlorobenzene, or a mixture of two or more of the above compounds, or a mixture containing the above compounds as a major component.

The present invention is not limited to a treatment of polycarbonate. The present invention may be applied to polyesters in a broad sense, i.e., those having oxygen containing ester bonds, such as polyester, polysulfonate, polyamide, or polyphenylene oxide.

In treating the mixture of the polymer (in particular, polycarbonate) and the chlorinated organic solvent under heating, the portion to be brought into contact with the heated mixture in the treatment apparatus must be formed from the acid resistant inorganic material, in accordance with the present invention.

The term "acid resistant inorganic material" used in the present specification means a material selected from a group consisting of (A) a metallic composition containing at least 85% by weight of copper, nickel or a mixture thereof, and
(B) a ceramic material. More particularly, the "acid resistant inorganic material" includes
  (a) a copper having a purity of at least 85% by weight;
  (b) a nickel having a purity of at least 85% by weight;
  (c) a copper-nickel alloy wherein a sum of a copper content and a nickel content is at least 85% by weight; and
  (d) a ceramic material.

In addition to copper or nickel, the metallic composition may contain metals, such as iron, chromium or zinc, so as to generally impart strength or workability to the material. As examples of the alloy, there may be mentioned, Nickel 200 (98% or more by weight of nickel, 0.13% by weight of copper), Monel 400 (66% by weight of nickel, 31.5% by weight of copper, 1.35% by weight of iron), Cupronickel (30% by weight of nickel, 69% by weight of copper, 0.6% by weight of iron), red brass (86% by weight of copper, 0.05% by weight of iron, 14% by weight of zinc).

If the portion to be brought into contact with the polymer containing liquid in the treating apparatus is formed from a material containing less than 85% by weight of copper and/or nickel, an improvement of coloring, the object of the present invention, cannot be sufficiently obtained.

The ceramics used in the present invention means a heat-resistant, nonmetallic, inorganic material, such as oxides, carbides, nitrides, and sulfides. Because the ceramics is corrosion resistant, almost all ceramics such as alumina, silicon carbide, or silicon nitride may be used, so long as it has good thermal and mechanical properties.

A dense oxide ceramics calcined at an elevated temperature, such as alumina, zirconia, zircon, or magnesia is preferable, because of excellent oxidative stability.

The apparatus in accordance with the present invention may have a structure sames as those of any conventional apparatuses used for treating a polymer containing liquid (in particular, a polycarbonate solution) under heating, except that the portion thereof to be brought into contact with the polymer (in particular, polycarbonate) containing the chlorinated organic solvent is formed from the different material.

As the apparatus of the present invention for treating the polymer containing liquid under heating, various apparatuses including a heating vessel or pipes (for example, a solvent removing apparatus, or an extruding apparatus) may be mentioned, so long as the mixture therein of the polymer and the chlorinated organic solvent is heated and treated at a temperature above a glass transistion temperature of the polymer. Therefore, the present invention includes the case wherein the mixture is heated; and then various treatments are carried out; the heated mixture is subjected to various treatments; or the heated mixture is conveyed to various apparatuses.

Referring to the attached drawings, a treatment of a polycarbonate solution will be illustrated hereinafter.

Figure 1:
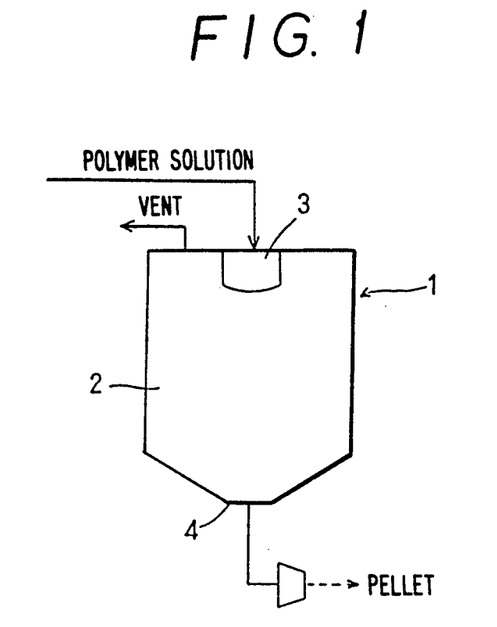
FIG. 1 illustrates one embodiment of a solvent removing apparatus according to the present invention.

FIG. 1 illustrates one embodiment of a solvent removing apparatus according to the present invention. The solvent removing apparatus 1 has a structure same as that of a conventional apparatus, and comprises a main body 2, and a heat exchanger 3 arranged on an upper portion thereof. The polycarbonate solution is introduced into the heat exchanger 3 together with a heating medium, and heated thereby. The chlorinated organic solvent in the polymer solution is evaporated and removed, and the polycarbonate is taken in the form of a melted polymer from a discharge port 4. In the solvent removing apparatus 1 having such a structure, at least a portion to be brought into contact with the polycarbonate solution, for example, a surface of a flow channel for the polycarbonate in the heat exchanger 3, must be made of the above-mentioned acid resistant inorganic material. Preferably, a lower portion of the main body 2 to which the melted polycarbonate is dropped from the heat exchanger 3, and the discharge port 4 are formed from the same material. Further, the entire main body 2 including pipes, and the whole heat exchanger 3 may be made of the above-mentioned acid resistant inorganic material.

Figure 2:
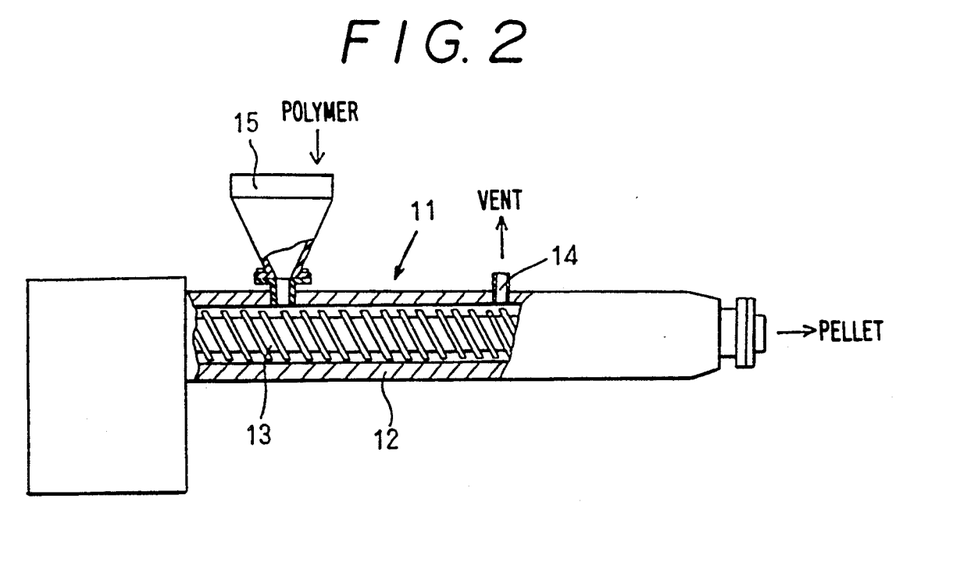
FIG. 2 is a partially broken-away side view of one embodiment of an extruding apparatus according to the present invention.

FIG. 2 illustrates one embodiment of an extruding apparatus according to the present invention. The extruding apparatus 11 has a structure same as that of a conventional extruding apparatus, and comprises a casing 12, a screw 13 arranged therein, and a venting means 14. In the extruding apparatus 11 having such a structure, an inside wall of the casing 12 and a surface of the screw 13 which are brought into contact with the polycarbonate having the chlorinated organic solvent must be formed from the above-mentioned acid resistant inorganic material. Further, a surface of a hopper 15 or the like may be made of the above-mentioned acid resistant inorganic material.

The portion made of the above-mentioned acid resistant inorganic material can be prepared by integrally forming. The ceramics layer may be formed on the surface by coating or adhering. The metal or alloy layer may be formed by plating, spraying, or adhering.

EXAMPLES

The present invention now will be further illustrated by, but is no means limited to, the following Examples.

REFERENTIAL EXAMPLE

To evaluate an effect of a metallic material in a heat treatment, a polycarbonate solution was treated under heating, using a glass apparatus.

Figure 3:
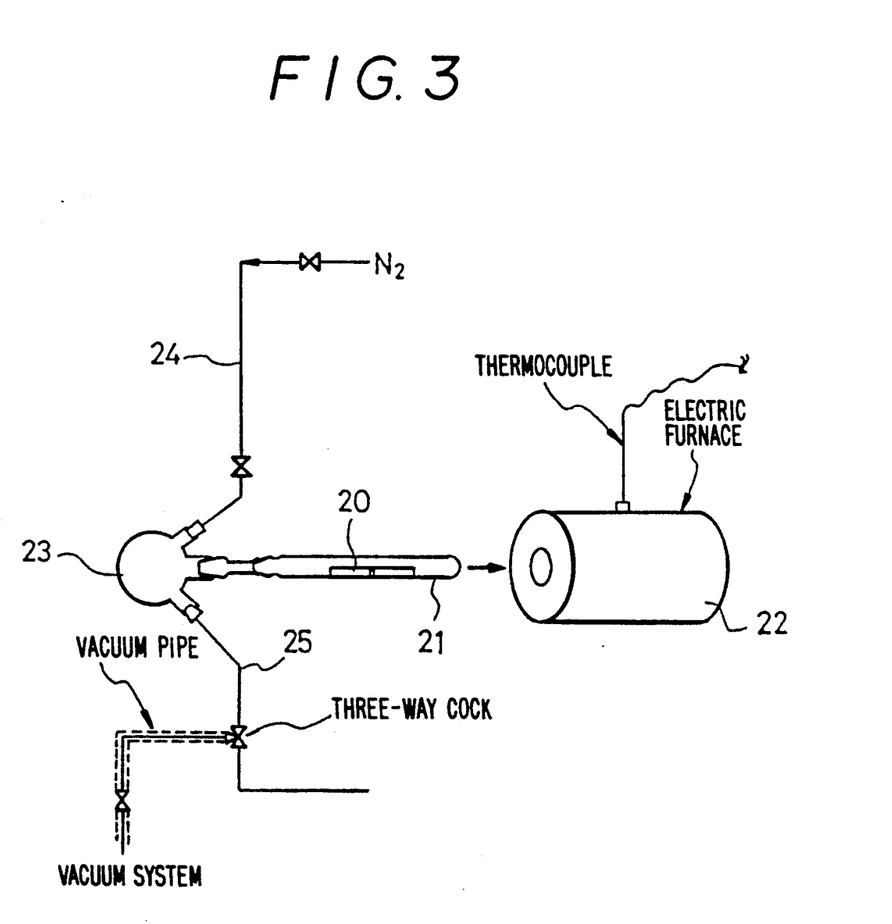
FIG. 3 is a sectional view of a solvent removing apparatus used in Referential, Working and Comparative Examples.

As an apparatus for a heat treatment, the apparatus shown in FIG. 3 was used. A sample is poured on a glass board having a semicylindrical shape (a radius is 15 mm, and a length is 100 mm). The whole is introduced in a closed-end tube 21 made of silica glass, and then, heated by an electric furnace 22 (RONT-2; 1.2 KW; Toyo Kagaku Sangyo K. K.). An open-end of the glass tube 21 is connected with a three-way cock 23. The three-way cock 23 is also connected with a pipe 24 for introducing a nitrogen gas, and a venting pipe 25.

As a sample in this example, a polycarbonate solution (concentration=25% by weight; water content=1300 ppm by weight) was prepared by dissolving in methylene chloride (guaranteed reagent; Wako Junyaku Kogyo K. K.) a polycarbonate (Toughlon A 2200; Idemitsu Petrochemical Co., Ltd.) which has been obtained by interfacial polycondensation of bisphenol A and phosgene.

The polycarbonate solution (about 5 ml) was poured on the glass board 20, and heated under a nitrogen gas at 300° C. for 30 minutes. Then, the residual resin was allowed to cool to a room temperature, and dissolved in methylene chloride. No insoluble matter was observed. A yellow index (YI) thereof corresponded to 2.5 as a plate. The yellow index was calculated by interpolation from the coloring of the resulting solution, on the basis of light permeability measured for a solution of known polycarbonate.

EXAMPLES 1 to 5, AND COMPARATIVE EXAMPLES 1 to 7

The heat treatment as mentioned in the Referential Example was repeated, using the heat treatment apparatus and polycarbonate solution as in the Referential Example, under the same conditions as in the Referential Example, by pouring metallic pieces (5×70×0.5 mm) as shown in Table 1, and polycarbonate solution. Dissolving states and YI of the corresponding plates for the resins after cooling were observed. The results are listed in table 1.

TABLE 1

| Example | Metal piece | Metal composition (wt %)* | | | | | YI of Corresponding plate | Insoluble matter |
| --- | --- | --- | --- | --- | --- | --- | --- | --- |
| | | Fe | Ni* | Cr | Mo | Co* | Cu + Ni | | |
| Referential Ex. | none | — | — | — | — | — | — | 2.5 | none |
| Working Ex. 1 | Copper | — | — | — | — | >95 | >95 | 2.6 | none |
| Working Ex. 2 | Nickel 200 | — | >98 | — | — | 0.13 | >98 | 3.4 | none |
| Working Ex. 3 | Monel 400 | 1.35 | 66 | — | — | 31.5 | 97.5 | 3.5 | none |
| Working Ex. 4 | Cupronickel | 0.6 | 30 | — | — | 69 | 99 | 2.9 | none |
| Working Ex. 5 | Red brass | 0.05 | — | — | Zn14 | 86 | 86 | 4.8 | trace |
| Comparative Ex. 1 | SUS 316L | 70 | 12 | 16 | 2 | — | 12 | 38 | a lot |
| Comparative Ex. 2 | SUS 444 | 81 | — | 17 | 1.7 | — | — | 31 | a lot |
| Comparative Ex. 3 | Hastelloy B-2 | 0.1 | 69 | — | 28 | — | 69 | 22 | a few |
| Comparative Ex. 4 | Hastelloy G | 6 | 58 | 22 | 6 | 6 | 64 | 28 | a lot |
| Comparative Ex. 5 | Titanium (Ti) | — | — | — | — | — | — | 46 | a lot |
| Comparative Ex. 6 | Brass | — | — | — | Zn30 | 70 | 70 | 18.2 | a few |
| Comparative Ex. 7 | Inconel 600 | 3 | 67 | 18 | — | 0.5 | 67.5 | 52 | a lot |

*Balance is metallic impurities other than the listed.

EXAMPLE 6

Figure 4:
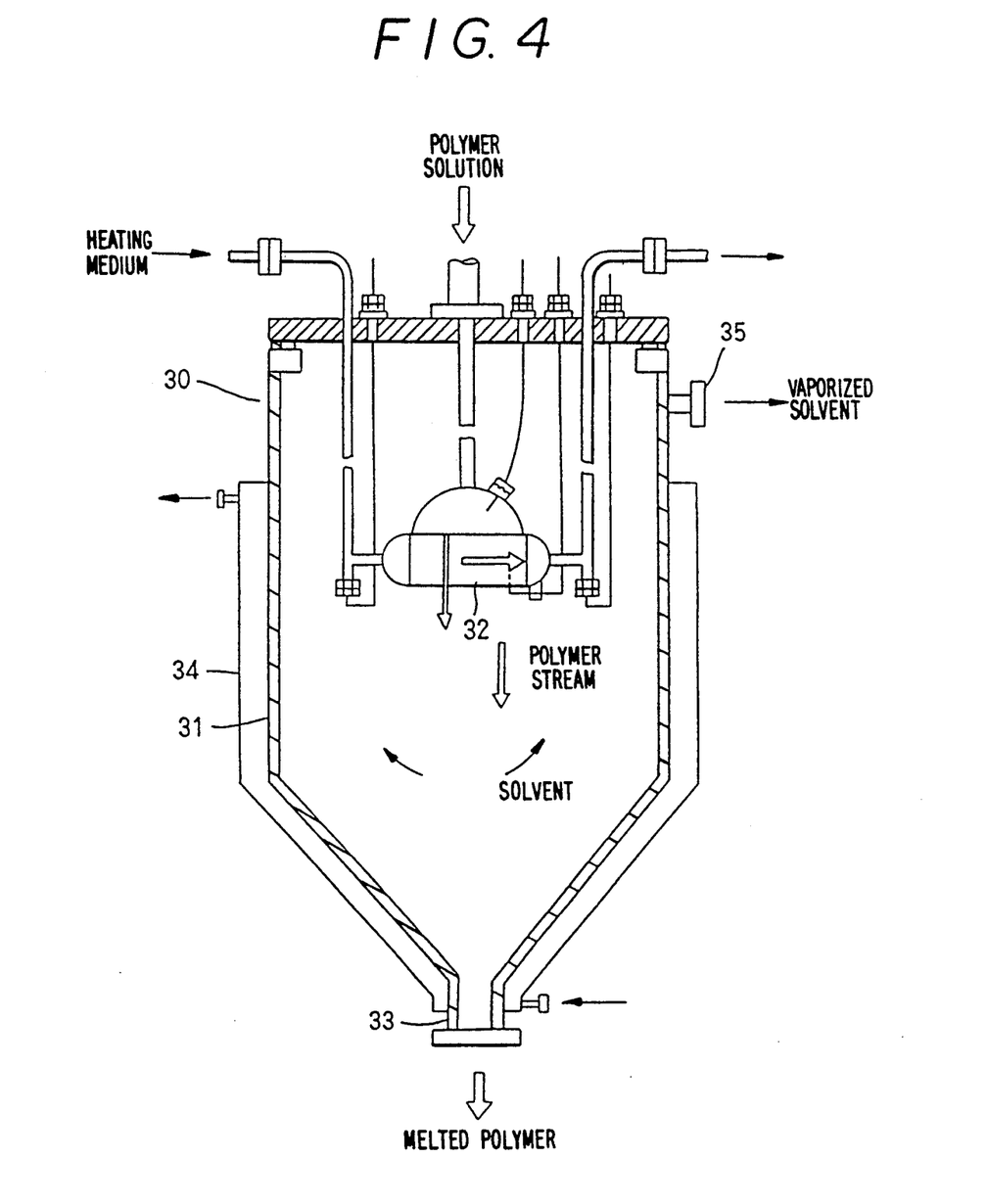
FIG. 4 is a sectional view of a solvent removing apparatus used in Working and Comparative Examples.

A polycarbonate solution was heated to remove solvent, using the solvent removing apparatus 30 as shown in FIG. 4.

The solvent removing apparatus 30 comprises a main body 31, which has a heat exchanger 32 arranged to the upper portion thereof, and a discharge port 33 arranged to the lower portion thereof. The main body 31 is covered with a jacket 34, and heated at a predetermined temperature by a heating medium supplied into the jacket 34. In the upper portion of the main body 31, a venting port 35 connected with a vacuum pump or the like is arranged to render the inside of the main body 31 to a predetermined vacuum state, and discharge a vaporized solvent.

The main body 31 of the solvent removing apparatus 30 has an upper maximum diameter of 500 mm, a height of 2000 mm, and a capacity of about 0.2 m³. A gear pump is provided in the lower portion of the main body to discharge a melted polymer.

Figure 5:
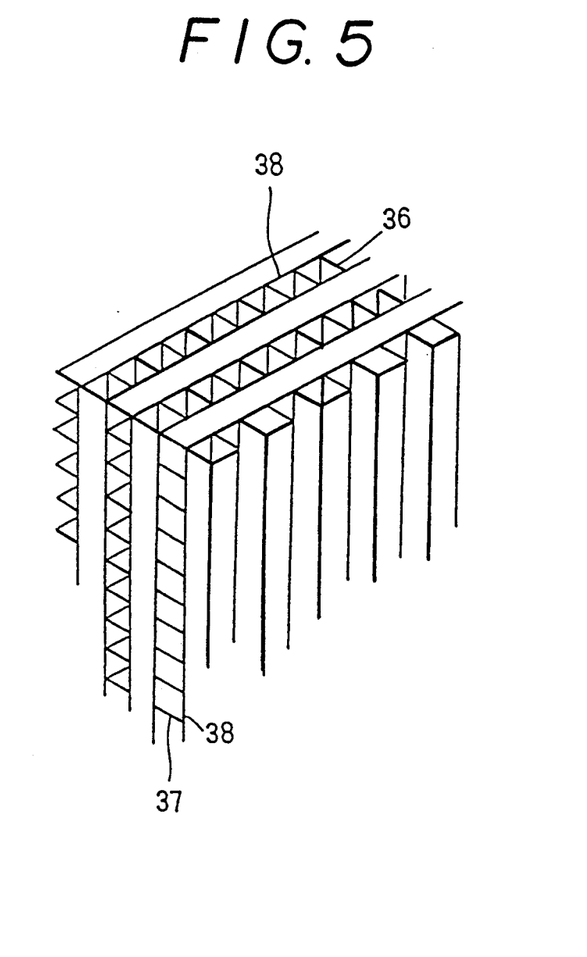
FIG. 5 is an enlarged perspective view of a main part of the unit.
Figure 6:
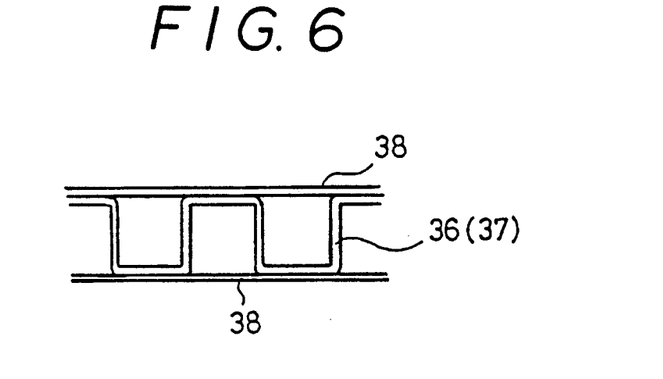
FIG. 6 is an enlarged sectional view of the main part of the unit.
Figure 7:
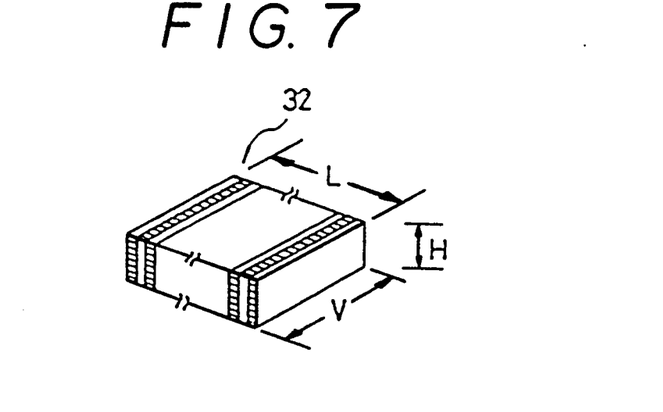
FIG. 7 is a perspective view of the unit.

The heat exchanger 32 used was a plate-fin type one. As shown in FIGS. 5 to 7, the heat exchanger 32 was prepared by combining corrugated metal plates 36 and 37 (straight fin plate) having a thickness of 0.2 mm and a corrugation height of 5 mm in a right angle, and piling ten metal plates 36, eleven metal plates 37, and twenty two separating plates 38 (a tube plate) having a thickness of 0.2 mm, so that a flow channel for the polycarbonate solution is composed of the metal plates 36, a flow channel for the heating medium, i.e., a heating chamber, is composed of the metal plates 37, and the heating chambers are arranged to both sides of the flow channel for the polycarbonate solution. The heat exchanger unit has a length (L) of about 105 mm, a width (V) of about 150 mm and a height (H) of about 70 mm as an exterior. The heat exchanger unit is arranged so that the polycarbonate solution is passed in a direction of the height.

All portions, including the heat exchanger 32, which would be brought into contact with the polycarbonate in the chlorinated organic solvent at a high temperature, i.e., the inside of the lower portion of the main body and the discharge port were made of copper (95% or more by weight of copper).

The heat exchanger and the main body in the solvent removing apparatus having such a structure were heated at 300° C., and the main body was adjusted by −740 mmHg reduction of a pressure. Into the solvent removing apparatus, supplied was a polycarbonate solution (at a rate of 5 liters per hour) prepared by dissolving a polycarbonate having a viscosity-average molecular weight of 26,000 in methylene chloride as a solvent, and adjusting the concentration to about 20% by weight. The polycarbonate solution had a water content of 1300 ppm by weight, and a dissolved oxygen concentration of 52 ppm by weight.

After a little while from the supplement of the polycarbonate solution, the melted polycarbonate was obtained from the gear pump in the lower portion of the main body. Further, a pelletizer was arranged to the discharge port of the solvent removing apparatus to pelletize the resulting polycarbonate. The residual methylene chloride in the resulting polycarbonate was as low as 52 ppm by weight. The coloring was as good as 3.2 in the permeability type YI. Further, the molecular weight was not lowered (25500), and the product having good properties was obtained.

COMPARATIVE EXAMPLE 8

The procedure as described in Example 6 was repeated, except that the main body was made of SUS 316 L. YI of the resulting polymer was 32. A lot of insoluble matter was observed, after dissolving in methylene chloride. After operating the apparatus for 2 hours, the main body was opened to find deteriorated polycarbonate adhered to the inside of the main body.

EXAMPLE 7

An extruder with a vent wherein a screw diameter was 20 mm, and a screw length was 45 cm, and portions to be brought into contact with the polycarbonate were made of Monel 400, was prepared. The maximum rate of the extruder was 1.5 Kg/hour.

After incorporating about 5000 ppm by weight of methylene chloride to the pellet obtained in Example 6, the mixture was supplied from a hopper to the extruder in a conventional manner to carry out an extrusion at 280° C. to produce a pellet.

Although a small amount of bubbles was found in the resulting pellet, no coloring deterioration (which is usually expected in a conventional method) was observed. The yellow index (YI) of the pellet was 3.8.

EXAMPLE 8

A polycarbonate solution was heated to remove solvent, using the solvent removing apparatus 30 as shown in FIG. 4.

The solvent removing apparatus 30 comprises a main body 31, which has a heat exchanger 32 arranged to the upper portion thereof, and a discharge port 33 arranged to the lower portion thereof. The main body 31 is covered with a jacket 34, and heated at a predetermined temperature by a heating medium supplied into the jacket 34. In the upper portion of the main body 31, a venting port 35 connected with a vacuum pump or the like is arranged to render the inside of the main body 31 to a predetermined vacuum state, and discharge a vaporized solvent.

The main body 31 of the solvent removing apparatus 30 has an upper maximum diameter of 500 mm, a height of 2000 mm, and a capacity of about 0.2 m$^3$.

The main body 31 was formed from SUS304, except that the portions which would be brought into contact with the polycarbonate in the chlorinated organic solvent at a high temperature, i.e., the inside of the lower portion of the main body and the discharge port, were coated with alumina by spraying.

The heat exchanger 32 used was a plate-fin type one. As shown in FIGS. 5 to 7, the heat exchanger 32 was prepared by combining corrugated metal plates 36 and 37 (straight fin plate) having a thickness of 0.2 mm and a corrugation height of 5 mm in a right angle, and piling ten metal plates 36, eleven metal plates 37, and twenty two separating plates 38 (a tube plate) having a thickness of 0.2 mm, so that a flow channel for the polycarbonate solution is composed of the metal plates 36, a flow channel for the heating medium, i.e., a heating chamber, is composed of the metal plates 37, and the heating chambers are arranged to both sides of the flow channel for the polycarbonate solution. The heat exchanger unit has a length (L) of about 105 mm, a width (V) of about 150 mm and a height (H) of about 70 mm as an exterior. The heat exchanger unit is arranged so that the polycarbonate solution is passed in a direction of the height. The heat exchanger 32 was made of SUS 304, in view of heat transmission.

The heat exchanger and the main body in the solvent removing apparatus having such a structure were heated at 300° C., and the main body was adjusted by −749 mmHg reduction of a pressure. Into the solvent removing apparatus, supplied was a polycarbonate solution (at a rate of 5 liter per hour) prepared by dissolving a polycarbonate having a viscosity-average molecular weight of 26,000 in methylene chloride as a solvent, and adjusting the concentration to about 20% by weight. The polycarbonate solution had a water content of 1300 ppm by weight, and a dissolved oxygen concentration of 52 ppm by weight.

After a little while from the supplement of the polycarbonate solution, the melted polycarbonate was obtained from the gear pump in the lower portion of the main body. Further, a pelletizer was arranged to the discharge port of the solvent removing apparatus to pelletize the resulting polycarbonate. The coloring of the resulting polycarbonate was as good as 3.2 in the permeability type YI. The molecular weight of the polycarbonate was not lowered (25500). Further, the residual methylene chloride was as low as 60 ppm by weight, and the product having good properties was obtained.

EXAMPLE 9

The procedure as in Example 8 was repeated, except that the portion coated with alumina was replaced by that coated with zirconia.

The coloring (YI) of the resulting polycarbonate was 2.9. The molecular weight was not lowered (26000). Further, the residual methylene chloride was as low as 55 ppm by weight, and the product having good properties was obtained.

EXAMPLE 10

The procedure as in Example 8 was repeated, except that the portion coated with alumina was replaced by that coated with magnesium oxide.

The coloring (YI) of the resulting polycarbonate was 3.2. The molecular weight was not lowered (25300). Further, the residual methylene chloride was as low as 58 ppm by weight, and the product having good properties was obtained.

EXAMPLE 11

The procedure as in Example 8 was repeated, except that the portion coated with alumina was replaced by that coated with chromium oxide.

The coloring (YI) of the resulting polycarbonate was 2.8. The molecular weight was not lowered (25200). Further, the residual methylene chloride was as low as 54 ppm by weight, and the product having good properties was obtained.

EXAMPLE 12

The procedure as in Example 8 was repeated, except that the portion coated with alumina was replaced by that coated with silicon carbide.

The coloring (YI) of the resulting polycarbonate was 3.0. The molecular weight was not lowered (25700). Further, the residual methylene chloride was as low as 63 ppm by weight, and the product having good properties was obtained.

After the experiment, the inside of the main body was observed to find a few deteriorated polymer adhered thereto. However, the quality of the product was not substantially affected.

EXAMPLE 13

The procedure as in Example 8 was repeated, except that the portion coated with alumina was replaced by that coated with zinc sulfide.

The coloring (YI) of the resulting polycarbonate was 3.1. The molecular weight was not lowered (25800). Further, the residual methylene chloride was as low as 57 ppm by weight, and the product having good properties was obtained.

After the experiment, the inside of the main body was observed to find a few deteriorated polymer adhered thereto. However, the quality of the product was not substantially affected.

COMPARATIVE EXAMPLE 9

The procedure as in Example 8 was repeated, except that the ceramics coating was not carried out.

The coloring (YI) of the resulting polycarbonate was 46. The residual methylene chloride was 61 ppm by weight. When dissolved in methylene chloride, a lot of insoluble matter was observed. After carrying out the operation for 2 hours, the inside of the main body was observed to find a deteriorated polymer adhered thereto.

COMPARATIVE EXAMPLE 10

The procedure as in Example 8 was repeated, except that the main body was formed from titanium and the ceramics coating was not carried out.

The coloring (YI) of the resulting polycarbonate was 82. The residual methylene chloride was 57 ppm by weight. When dissolved in methylene chloride, a lot of insoluble matter was observed. After carrying out the operation for 2 hours, the inside of the main body was observed to find a deteriorated polymer adhered thereto. When the adhered polymer was removed, a lot of pores (produced by corrosion) were observed on the surface.

The results of Example 8 to 13 and Comparative Examples 9 and 10 are listed in Table 2.

TABLE 2

| Example | Material of body | State of treated polycarbonate | | Remarks |
|---|---|---|---|---|
| | | Coloring(YI)[1] | Molecular weight[2] | |
| Working Ex. 8 | Alumina (Al$_2$O$_3$) | 3.2 | 25500 | |
| Working Ex. 9 | Zirconia (ZrO$_2$) | 2.9 | 26000 | |
| Working Ex. 10 | Magnesium oxide (MgO) | 3.2 | 25300 | |
| Working Ex. 11 | Chromium oxide (Cr$_2$O$_3$) | 2.8 | 25200 | |
| Working Ex. 12 | Silicon carbide (SiC) | 3.0 | 25700 | A few deteriorated polymer adhered to body |
| Working Ex. 13 | Zinc sulfide (ZnS) | 3.1 | 25800 | A few deteriorated polymer adhered to body |
| Comparative Ex. 9 | SUS 304 (stainless steel) | 46 | 23200 | Many gels, after dissolved in solvent |
| Comparative Ex. 10 | Titanium (Ti) | 82 | 22100 | Many gels, after dissolved in solvent |

[1] Measured in accordance with JIS-K-7105, after preparing plates from resulting polymers.
[2] Viscosity-average molecular weight As explained above, the present invention can avoid the lowering the molecular weight, and reduce the coloring deterioration on the polycarbonate solution, in the heat treatment thereof, such as a step of removing the solvent by evaporation, or a step of extrusion. The transparency of the polycarbonate, which is the characteristic property thereof, can be satisfactorily obtained.

Because the apparatus according to the present invention can be made of easily available materials, it is easily constructed at a low cost.

Accordingly, the present invention may be widely used for the production of a high quality polycarbonate and other polymers.

Although the present invention has been described with reference to specific embodiments, various changes and modifications obvious to those skilled in the art are deemed to be within the spirit, scope and concept of the invention.

I claim:

1. A process for treating a mixture of a polymer and a chlorinated organic solvent under heating wherein coloring of the polymer due to thermal deterioration in the presence of the solvent is reduced, which comprises treating the mixture within an apparatus in which a portion thereof to be brought into contact with the heated mixture is made of an acid resistant inorganic material selected from the group consisting of a metallic composition containing at least 85% by weight of copper, nickel or a mixture thereof, and a ceramic material.

2. A process according to claim 1, wherein the apparatus is a solvent removing apparatus and the chlorinated organic solvent is removed from the mixture by heating the mixture to evaporate the solvent.

3. A process according to claim 1, wherein the apparatus is an extrusion apparatus and the mixture is extruded under heating.

4. A process according to claim 1, wherein the acid resistant inorganic material is a copper having a purity of at least 85% by weight.

5. A process according to claim 1, wherein the acid resistant inorganic material is a nickel having a purity of at least 85% by weight.

6. A process according to claim 1, wherein the acid resistant inorganic material is a copper-nickel alloy wherein a sum of a copper content and a nickel content is at least 85% by weight.

7. A process according to claim 1, wherein the acid resistant inorganic material is an oxide ceramics.

8. A process according to claim 1, wherein the polymer is polycarbonate, polyester, polysulfonate, polyamide, or polyphenylene oxide.

9. An apparatus for treating a mixture of a polymer and a chlorinated organic solvent under heating in which coloring of the polymer due to thermal decomposition in the presence of a solvent is reduced said apparatus comprising a portion thereof to be brought into contact with a heated mixture that is made of an acid resistant inorganic material selected from the group consisting of a metallic composition containing at least 85% by weight of copper, nickel or a mixture thereof, and a ceramic material.

10. An apparatus according to claim 9, wherein said apparatus is an apparatus for removing the chlorinated organic solvent from the mixture by heating the mixture.

11. An apparatus according to claim 9, wherein the apparatus is an apparatus for extruding the mixture under heating.

12. An apparatus according to claim 9, wherein the acid resistant inorganic material is a copper having a purity of at least 85% by weight.

13. An apparatus according to claim 9, wherein the acid resistant inorganic material is a nickel having a purity of at least 85% by weight.

14. An apparatus according to claim 9, wherein the acid resistant inorganic material is a copper-nickel alloy wherein a sum of a copper content and a nickel content is at least 85% by weight.

15. An apparatus according to claim 9, wherein the acid resistant inorganic material is an oxide ceramics.

16. An apparatus according to claim 9, wherein the polymer is polycarbonate, polyester, polysulfonate, polyamide, or polyphenylene oxide.

17. A process for recovery of a polymer produced by polycondensation of a dihydric phenol and phosgene in a chlorinated solvent wherein coloring of the polymer due to thermal deterioration in the presence of the solvent is reduced, which comprises heating a mixture of the polymer and the chlorinated organic solvent in an apparatus, in which a portion thereof to be brought into contact with the heated mixture is made of an acid resistant inorganic material selected from the group consisting of a metallic composition containing at least 85% by weight of copper, nickel or a mixture thereof, and a ceramic material.

18. A process according to claim 8, wherein the chlorinated organic solvent is methylene chloride, tetrachloroethane, trichloroethane, dichloroethane, trichloroethylene, dichloroethylene, chloroform, chlorobenzene, o-, m- or p-dichlorobenzene or a mixture thereof.

19. A process according to claim 17, wherein the polymer is a polycarbonate and the chlorinated organic solvent is methylene chloride, tetrachloroethane, trichloroethane, dichloroethane, trichloroethylene, dichloroethylene, chloroform, chlorobenzene, o-, m- or p-dichlorobenzene or a mixture thereof.

* * * * *